(12) United States Patent
Liu

(10) Patent No.: US 12,065,215 B1
(45) Date of Patent: Aug. 20, 2024

(54) CONTROL DEVICE OF INTERNAL SPEED CHANGE DEVICE OF WHEEL HUB FOR INDIRECT CLUTCHING OPERATION

(71) Applicant: Jen-Chih Liu, Kaohsiung (TW)

(72) Inventor: Jen-Chih Liu, Kaohsiung (TW)

(73) Assignee: NEW KAILUNG GEAR CO., LTD, Kaohsiung (TW)

( * ) Notice: Subject to any disclaimer, the term of this patent is extended or adjusted under 35 U.S.C. 154(b) by 37 days.

(21) Appl. No.: 18/163,887

(22) Filed: Feb. 3, 2023

(51) Int. Cl.
| | |
|---|---|
| *B62M 11/16* | (2006.01) |
| *B60B 27/00* | (2006.01) |
| *B60B 27/02* | (2006.01) |
| *B60B 27/04* | (2006.01) |
| *F16D 41/30* | (2006.01) |

(52) U.S. Cl.
CPC ......... *B62M 11/16* (2013.01); *B60B 27/0021* (2013.01); *B60B 27/023* (2013.01); *B60B 27/047* (2013.01); *F16D 41/30* (2013.01)

(58) Field of Classification Search
CPC ....... F16D 41/30; F16H 61/686; B62M 11/16; B60B 27/023; B60B 27/047
See application file for complete search history.

(56) References Cited

U.S. PATENT DOCUMENTS

| | | | | |
|---|---|---|---|---|
| 4,721,013 A | * | 1/1988 | Steuer | B62M 11/16 192/217.4 |
| 11,565,773 B1 | * | 1/2023 | Liu | B62M 11/18 |
| 2009/0131214 A1 | * | 5/2009 | Okoochi | F16D 41/067 475/312 |
| 2009/0203490 A1 | * | 8/2009 | Fukui | B62M 11/16 475/297 |
| 2012/0097467 A1 | * | 4/2012 | Maeno | B62M 11/16 180/206.7 |

* cited by examiner

*Primary Examiner* — Timothy Hannon

(57) ABSTRACT

A control device of an internal speed change device of a wheel hub for indirect clutching operation includes a sun gear installed on a sun gear ring which is installed on a wheel shaft; a shaft claw installed between the sun gear and the wheel shaft; a stepping clutch mechanism installed on the wheel shaft; the stepping clutch mechanism being driven by a rotating unit; the stepping clutch mechanism serving to control opening and closing of the shaft claw to control fixedness of the sun gear; the stepping clutch mechanism including a plurality of first control claws and a plurality of second control claws for controlling clutching operation between the stepping clutch mechanism and the rotating unit; and a lever installed in one of at least one guiding trench of the wheel shaft.

13 Claims, 13 Drawing Sheets

CONTROL DEVICE OF INTERNAL SPEED CHANGE DEVICE OF WHEEL HUB FOR INDIRECT CLUTCHING OPERATION

FIELD OF THE INVENTION

The present invention relates to bicycles, and in particular to a control device of an internal speed change device of a wheel hub for indirect clutching operation.

BACKGROUND OF THE INVENTION

Prior art clutching switching of an internal speed change device of a bicycle's wheel hub is operated by retaining or un-retaining of a sun gear. However, prior art internal speed change device uses a lever to directly control opening and closing of a control claw (such as a shaft claw between the sun gear and a wheel shaft, or a teethed claw between the sun gear and a sun gear ring) to control the retaining or un-retaining of a sun gear. Above directly controlling with the lever has many disadvantages that the lever need a large moving to operate the clutching of the sun gear and the wheel shaft, thus a larger structure with is required for operation of the lever. The internal speed change device also requires more force to drive the lever because the lever receives high resistance directly from the sun gear during speed change operation, thus lifetime of the lever is also decreased.

Therefore, the directly controlling structure in above prior art designs is not an ideal solution for internal speed change device of an electric bicycle due to the larger structure and the larger demand for the operating force. The weight of the electric bicycle is increased and the power consumption is also increased. Furthermore, the electric bicycle requires a motor with high torque to provide enough operating force for speed change operation, thus the cost is also increased.

All these defects have seriously affected the utilization of industry and economic worth. Therefore there is an eager demand for a novel design which can improve these disadvantages of the prior arts.

SUMMARY OF THE INVENTION

Accordingly, the object of the present invention is to provide a control device of an internal speed change device of a wheel hub for indirect clutching operation, wherein advantages of the present invention are that the present invention provides a precise and simple clutching structure of an internal speed change device of a wheel hub. Furthermore, the present invention is advantageous in industry with a higher economic effect. The lever of the present invention controls the fixedness of the sun gear by a non-direct way of operation so that the lever does not receive high resistance directly from the sun gear during speed change operation. As a result, operation of the lever is easier and saves more efforts so as to ensure safety of the operation of the lever and increase service life of the lever.

To achieve above object, the present invention provides a control device of an internal speed change device of a wheel hub for indirect clutching operation comprising: a sun gear installed on a sun gear ring which is installed on a wheel shaft; the wheel shaft being formed with at least one guiding trench; a shaft claw installed between the sun gear and the wheel shaft; the shaft claw serving to control fixedness of the sun gear; a stepping clutch mechanism installed on the wheel shaft; the stepping clutch mechanism being driven by a rotating unit; the stepping clutch mechanism serving to control opening and closing of the shaft claw to control fixedness of the sun gear; the stepping clutch mechanism including a plurality of first control claws and a plurality of second control claws for controlling clutching operation between the stepping clutch mechanism and the rotating unit; a lever installed in one of the at least one guiding trench; the lever being capable of moving axially in the guiding trench; and wherein the lever serves to control clutching operation between the first control claws and the rotating unit and control clutching operation between the second control claws and the rotating unit to cause the stepping clutch mechanism to perform a stepwise rotation with a fixed angle by driving of the rotating unit; the stepwise rotation of the stepping clutch mechanism controls opening and closing of the shaft claw to control fixedness of the sun gear; and the lever is installed with a sliding block for controlling opening and closing of the first control claws and the second control claws.

The present invention further provides a control device of an internal speed change device of a wheel hub for indirect clutching operation comprising: a sun gear installed on a sun gear ring which is installed on a wheel shaft; the wheel shaft being formed with at least one guiding trench; at least one teethed claw installed between the sun gear and the wheel shaft; the at least one teethed claw serving to control fixedness of the sun gear; a stepping clutch mechanism installed on the wheel shaft; the stepping clutch mechanism being driven by a rotating unit; the stepping clutch mechanism serving to control opening and closing of the at least one teethed claw to control fixedness of the sun gear; the stepping clutch mechanism including a plurality of first control claws and a plurality of second control claws for controlling clutching operation between the stepping clutch mechanism and the rotating unit; a lever installed in one of the at least one guiding trench; the lever being capable of moving axially in the guiding trench; and wherein the lever serves to control clutching operation between the first control claws and the rotating unit and control clutching operation between the second control claws and the rotating unit to cause the stepping clutch mechanism to perform a stepwise rotation with a fixed angle by driving of the rotating unit; the stepwise rotation of the stepping clutch mechanism controls opening and closing of the at least one teethed claw to control fixedness of the sun gear; and the lever is installed with a sliding block for controlling opening and closing of the first control claws and the second control claws.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
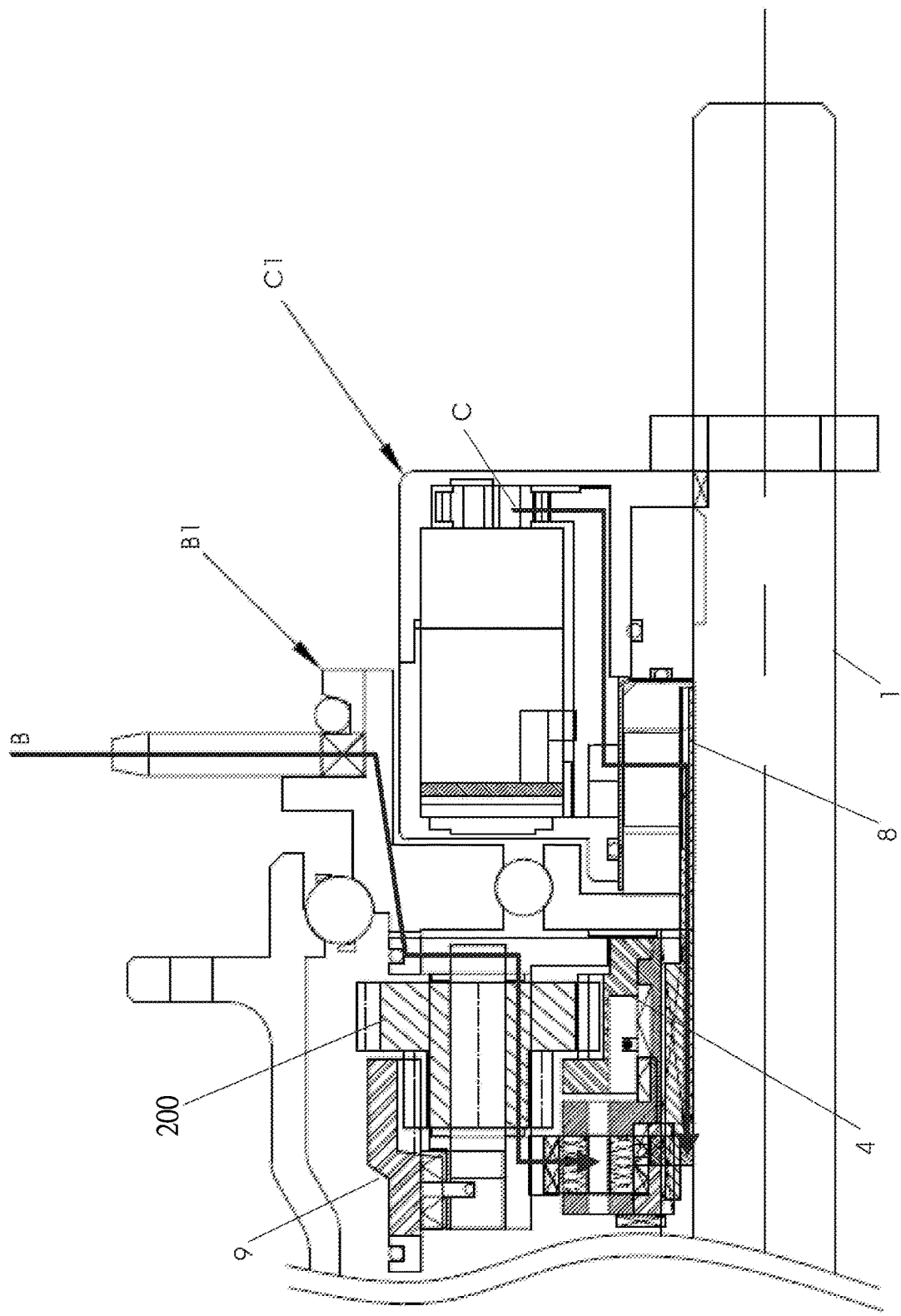
FIG. 1 is a schematic view of clutching power source paths of the internal speed change device of the wheel hub in the present invention.

Referring to FIG. 1, a schematic view of a first clutching power source path B and a second clutching power source path C of an internal speed change device of a wheel hub in the present invention is illustrated. The first clutching power source path B is provided with a rotating unit 90 to provide continuous rotating power as a driving power source for clutching of the internal speed change device. The rotating unit 90 is selected from a power input device B1, an inner teeth ring 9, a planet frame 2 and a power output device (not shown). The second clutching power source path C is provided with a control system C1 for controlling the clutching of the internal speed change device by a lever 8. For the convenience of explanation, a planet frame 2 is used as the rotating unit 90 in the first embodiment and second embodiment of the present invention.

Figure 2:
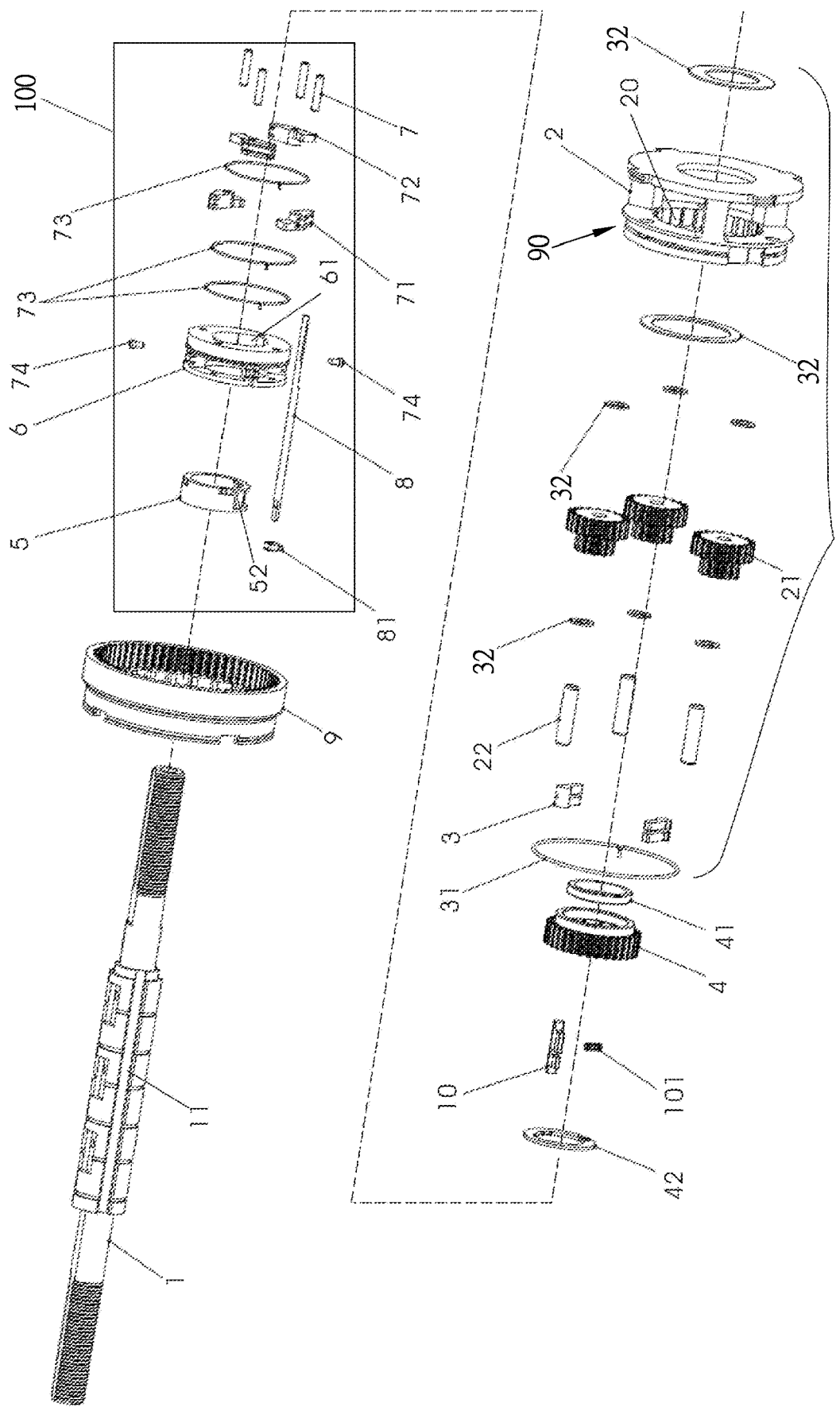
FIG. 2 is an exploded schematic view of the first embodiment of the present invention.
Figure 3:
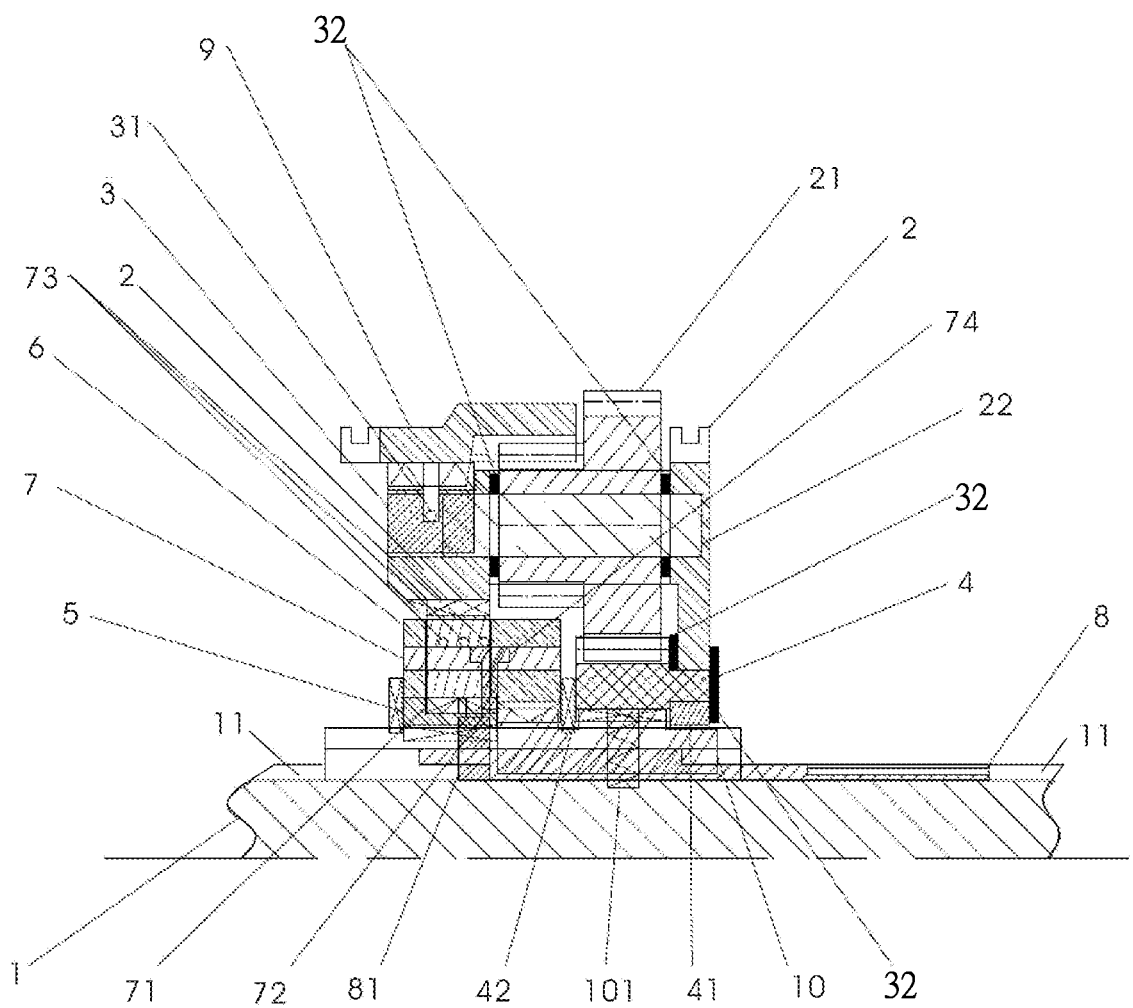
FIG. 3 is a cross sectional view of the first embodiment of the present invention after assembly.
Figure 18:
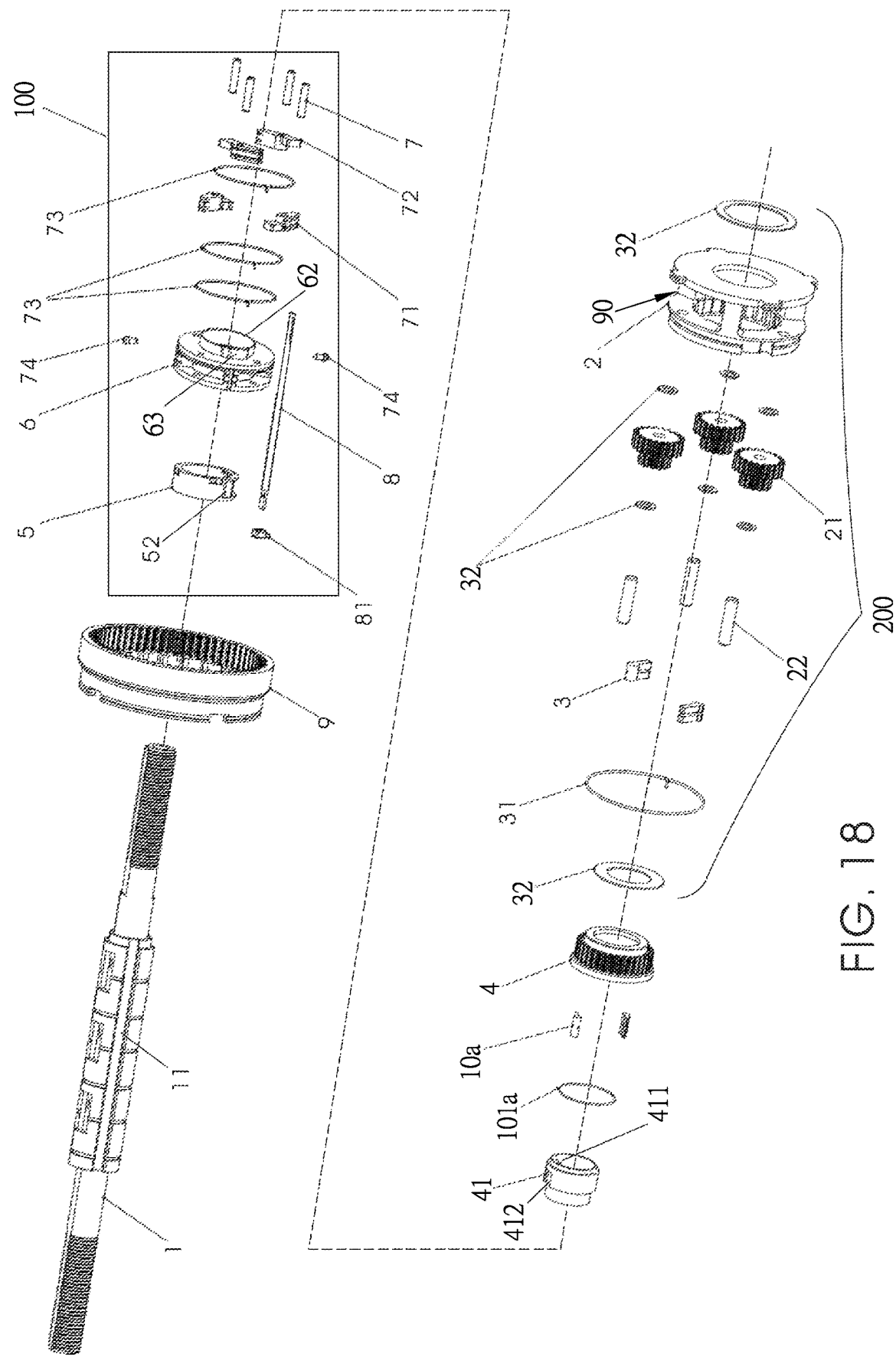
FIG. 18 is an exploded schematic view of the second embodiment of the present invention.

FIG. 2 shows the first embodiment of the present invention and FIG. 18 shows the second embodiment of the present invention. The first and second embodiments are provided with same lever 8 to control fixedness of a sun gear 4 of the internal speed change device by means of a non-direct operation and stepwise rotation of a stepping clutch mechanism 100.

Referring to FIG. 2, the first embodiment of the present invention includes the following elements.

A wheel shaft 1 is formed with a guiding trench 11.

A lever 8 is installed in one of the at least one guiding trench 11. The lever 8 is capable of moving axially in the guiding trench 11.

A sun gear 4 is installed on a sun gear ring 41 which is installed on the wheel shaft 1. A positioning buckling ring 42 serves to position the sun gear 4.

A shaft claw 10 and a shaft claw returning spring 101 are installed between the sun gear 4 and the wheel shaft 1. The shaft claw 10 serves to control fixedness of the sun gear 4.

Figure 12:
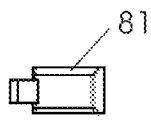
FIG. 12 is an elevation view of FIG. 10.
Figure 10:
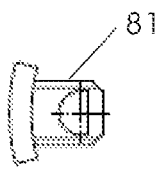
FIG. 10 shows the sliding block of the present invention.
Figure 11:
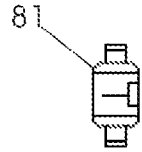
FIG. 11 is a right side view of FIG. 10.

A stepping clutch mechanism 100 is installed on the wheel shaft 1. The stepping clutch mechanism 100 is driven by a rotating unit 90. The stepping clutch mechanism 100 serving to control opening and closing of the shaft claw 10 to control fixedness of the sun gear 4. The stepping clutch mechanism 100 includes a plurality of first control claws 71 and a plurality of second control claws 72 for controlling clutching operation between the stepping clutch mechanism 100 and the rotating unit 90. The lever 8 serves to control clutching operation between the first control claws 71 and the rotating unit 90 and control clutching operation between the second control claws 72 and the rotating unit 90 to cause the stepping clutch mechanism 100 to perform a stepwise rotation with a fixed angle by driving of rotating unit 90. The stepwise rotation of the stepping clutch mechanism 100 controls opening and closing of the shaft claw 10 to control fixedness of the sun gear 4. The lever 8 is installed with a sliding block 81 (as shown in FIGS. 10 to 12) for controlling opening and closing of the first control claws 71 and the second control claws 72 so as to control the clutching operation between the stepping clutch mechanism 100 and the rotating unit 90.

The rotating unit 90 is selected from a power input device B1, an inner teeth ring 9, a planet frame 2 and a power output device. In this embodiment, the rotating unit 90 is a planet frame 2 which is capable of rotating. The wheel shaft 1 is installed with a planet mechanism 200. The planet mechanism 200 includes the planet frame 2 and a plurality of planet gears 21. The sun gear 4 is engaged to the planet gears 21. The planet gears 21 are installed on a plurality of planet gear shafts 22 of the planet frame 2. The inner side of the planet frame 2 is formed with inner teeth 20 for engaging to the first control claw 71 and the second control claw 72. A ratchet claw 3 and a ratchet claw returning spring 31 and a plurality of pads 32 are installed between the planet gears 2 and an inner teeth ring 9. The inner teeth ring 9 is installed on the wheel shaft 1. The ratchet claw 3 is driven by the planet frame 2 to drive the inner teeth ring 9.

Figure 5:
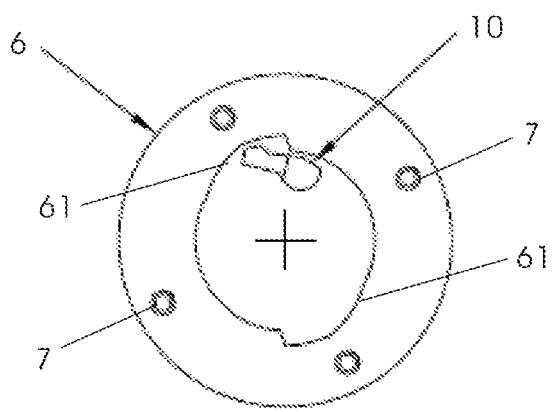
FIG. 5 is a schematic view showing that the ratchet claw clutching ring opens the shaft claw of the first embodiment of the present invention.
Figure 6:
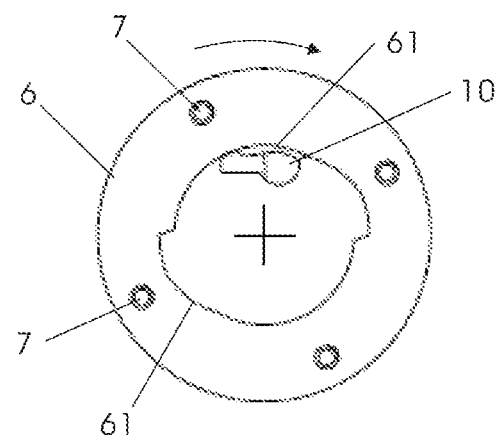
FIG. 6 is a schematic view showing that the ratchet claw clutching ring closes the shaft claw (after rotation of 90 degrees) of the first embodiment of the present invention.

The stepping clutch mechanism 100 includes:

A ratchet claw clutching ring 6 is installed with a plurality of claw control shafts 7. The first control claws 71 and the second control claws 72 are installed on the claw control shafts 7, respectively. Referring to FIGS. 5 to 6, an inner annular surface of the ratchet claw clutching ring 6 is formed with at least one inner recess 61 for controlling opening and closing of the shaft claw 10.

Figure 8:
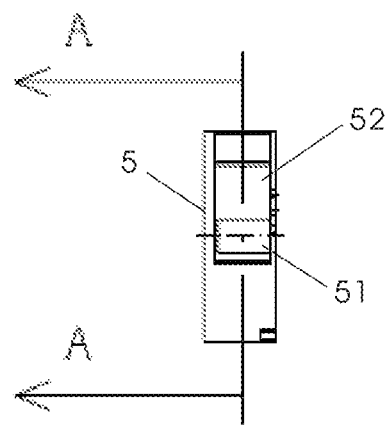
FIG. 8 is a left side view of FIG. 7.
Figure 7:
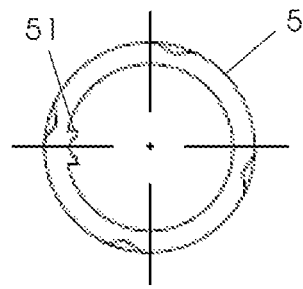
FIG. 7 is a front side view of the cam base of the present invention.
Figure 9:
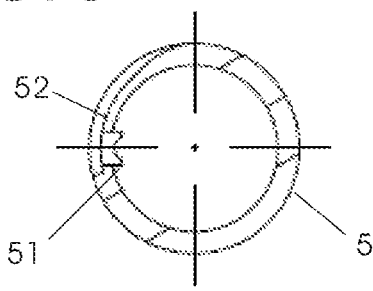
FIG. 9 is a cross sectional view along A-A of FIG. 7.

A cam base 5 (as shown in FIGS. 7 to 9) is positioned at an inner side of the ratchet claw clutching ring 6 and is formed with a guiding groove 51 and a lifting slope 52 positioned at an outer side of the guiding groove 51. The sliding block 81 is capable of moving axially in the guiding groove 51.

A claw control returning spring 73 encloses the claw control shafts 7.

A positioning pin 74 serves to position the claw control shafts 7.

The wheel shaft 1 passes through the sun gear 4 and the stepping clutch mechanism 100. The first control claws 71 and the second control claws 72 are positioned between an inner side of the planet frame 2 and an outer side of the cam base 5. The first control claws 71 and the second control claws 72 are arranged in an interleaved order. The lifting slope 52 and axial moving of the sliding block 81 serve to control the opening and closing of the first control claws 71 and the second control claws 72 to cause the ratchet claw clutching ring 6 to rotate stepwise by driving of the rotating unit 90. Stepwise rotation of the ratchet claw clutching ring 6 controls the opening and closing of the shaft claw 10 to control fixedness of the sun gear 4.

The cam base 5 is fixed in the inner side of the ratchet claw clutching ring 6. The ratchet claw clutching ring 6 is capable of rotating around the cam base 5. Referring to FIGS. 13 to 17, inner ends of each of the first control claws 71 and each of the second control claws 72 resist against the cam base 5.

The lever 8 serves to control the ratchet claw clutching ring 6 to be driven by the rotating unit 90 and rotated with a fixed angle around the cam base 5 of the stepping clutch mechanism 100.

Figure 4:
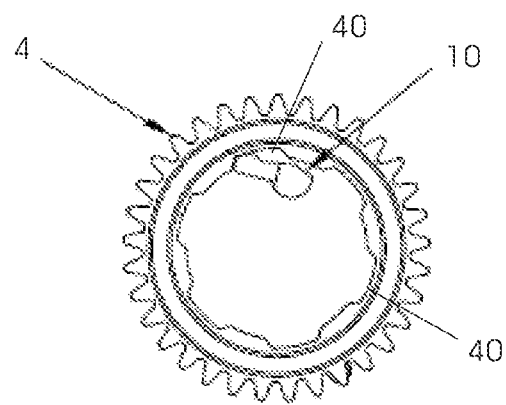
FIG. 4 is a schematic view showing the relation of the sun gear and shaft claw of the first embodiment of the present invention.

Referring to FIGS. 1 to 5, when an outer end of the shaft claw 10 enters into the inner recess 61 of the ratchet claw clutching ring 6, the shaft claw 10 is lifted to be opened and the sun gear 4 is fixed on the wheel shaft 1 and the rotation power is output by the inner teeth ring 9 and forms as increasing stepping speed. Referring to FIG. 6, when the shaft claw 10 leaves the inner recess 61 of the ratchet claw clutching ring 6, the shaft claw 10 is pressed down to be closed and the sun gear 4 is freed and not fixed on the wheel shaft 1. Therefore, speed changing of the internal speed change device is controlled by the fixedness of the sun gear 4. As illustrated in FIGS. 4 to 6, when the ratchet claw clutching ring 6 rotates through a predetermined angle (such as 90 degrees) so as to open or close the shaft claw 10, controlling of the fixedness of the sun gear 4 is achieved.

Figure 13:
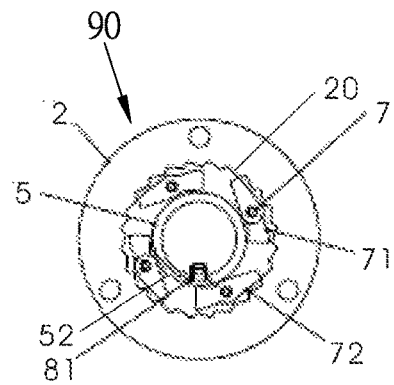
FIG. 13 is a schematic view showing the relations of the planet frame, the cam base, the sliding block (moving forwards), the first control claws and the second control claws.
Figure 14:
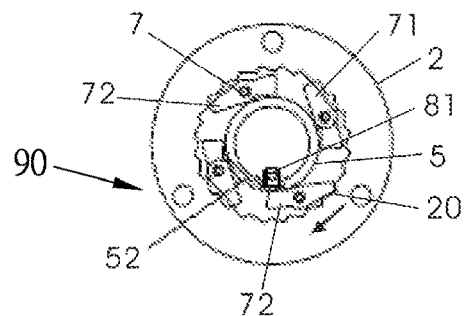
FIG. 14 is schematic view showing the relations of the planet frame, the cam base and the sliding block (moving backwards).
Figure 15:
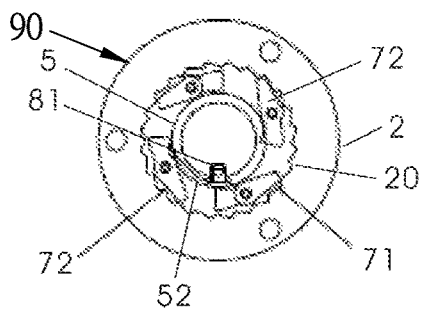
FIG. 15 is schematic view showing the relations of the planet frame which drives the first control claws and the second control claws to rotate to a specific angle (an example of 90 degrees), the cam base and the sliding block (moving forwards).
Figure 16:
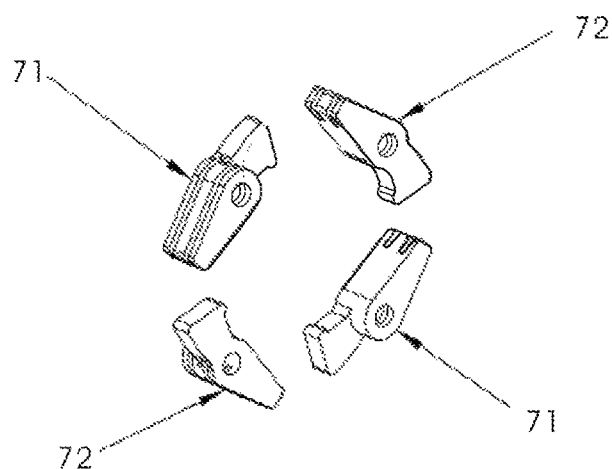
FIG. 16 is a schematic view showing the relation of the first control claws and the second control claws.
Figure 17:
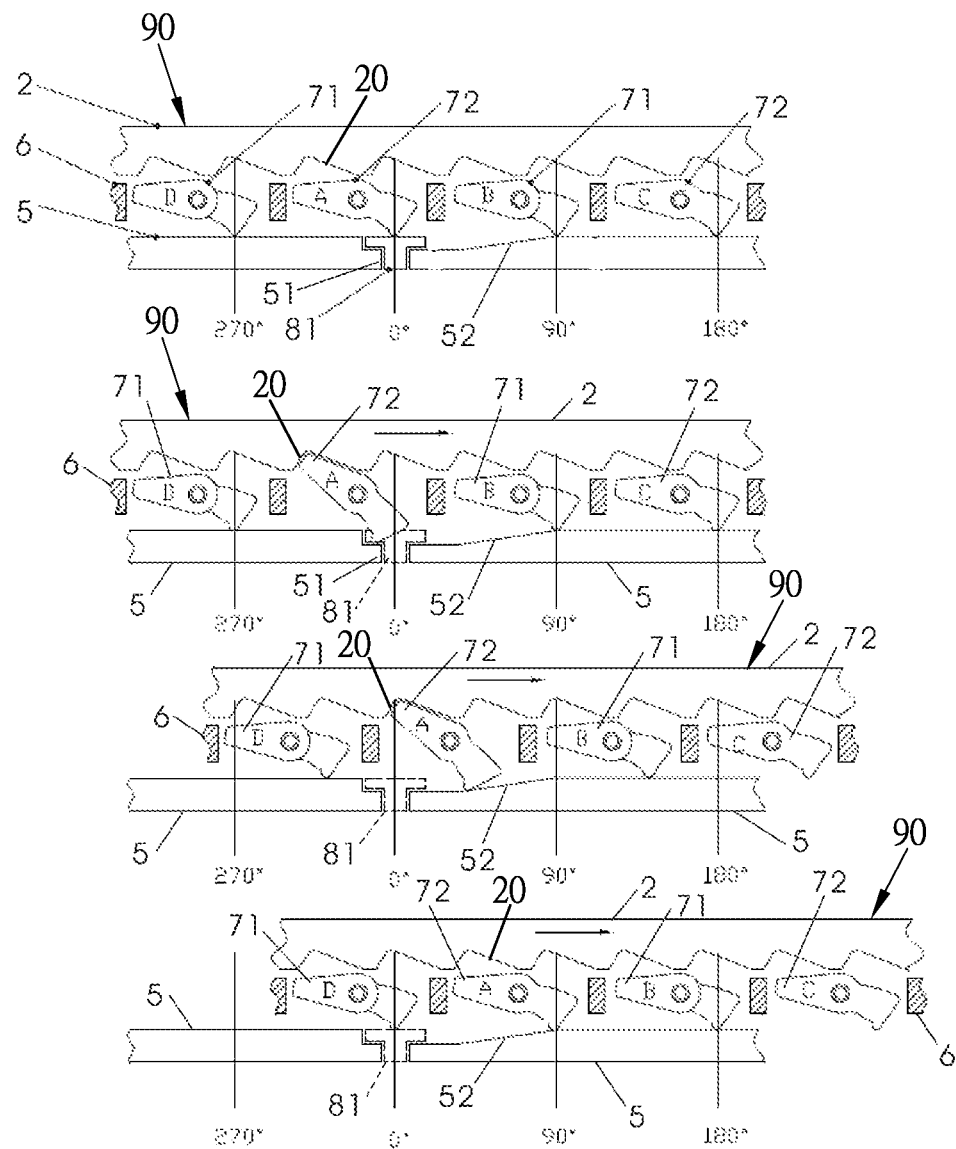
FIG. 17 is a schematic view showing the relations of the planet frame which drives the first control claws and the second control claws to rotate to a specific angle (an example of 90 degrees), the cam base and the sliding block, wherein the planet frame, the first control claws, the second control claws and the cam base are shown in a form of linear expansion.

Referring to FIGS. 13 and 17, the stepwise rotation of the ratchet claw clutching ring 6 is controlled by the sliding block 81, the first control claws 71 and the second control claws 72. In an initial state, the inner end of one of the second control claws 72 is resisted to be closed by the sliding block 81; and inner ends the other control claw 72 and the first control claws 71 is closed by resisting against the cam base 5. Referring to FIGS. 14 and 17, when the sliding block 81 moves forward, the inner end of the second control claw 72 originally resisted by the sliding block 81 enters into the guiding groove 51 and an outer end of this second control claw 72 is engaged to the inner teeth 20 of the planet frame 2 to cause this second control claws 72 to be opened. Then the planet frame 2 drives the first control claws 71 and the second control claws 72 and the ratchet claw clutching ring 6 to rotate through a predetermined angle; and the inner end of the second control claw 72 moves to the lifting slope 52. Referring to FIGS. 15 and 17, when the inner end of the second control claw 72 leaves the lifting slope 52, the outer end of the second control claw 72 leaves the inner teeth 20 of the planet frame 2 to cause the second control claw 72 to be closed again. At the same time, the inner end of the first control claw 71 adjacent to the second control claw 72 moves to the sliding block 81 and is resisted by the sliding block 81 to complete a speed change period. Therefore, the shaft claw 10 is opened or closed by above stepwise rotation of the ratchet claw clutching ring 6 and controls the fixedness of the sun gear 4.

Referring to FIGS. 18 to 31, the second embodiment of the present invention is illustrated. In this embodiment, those elements identical to those in the first embodiment are illustrated by the same numerals and they have the same functions and effects.

Figure 20:
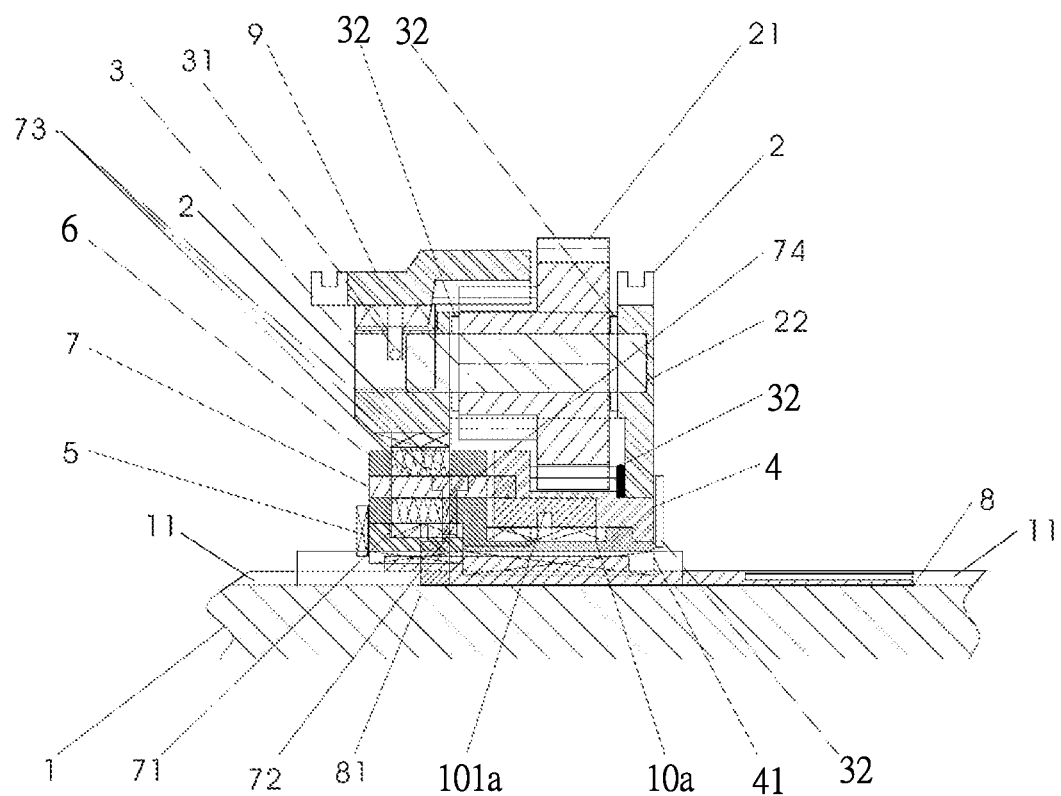
FIG. 20 is a cross sectional view of the second embodiment of the present invention after assembly.

Referring to FIGS. 18 and 20, the second embodiment of the present invention includes the following elements.

A wheel shaft 1 is formed with a guiding trench 11.

A lever 8 is installed in one of the at least one guiding trench 11. The lever 8 is capable of moving axially in the guiding trench 11.

A sun gear 4 is installed on a sun gear ring 41 which is installed on the wheel shaft 1.

At least one teethed claw 10a and a teethed claw returning spring 101a are installed between the sun gear 4 and the wheel shaft 1. The at least one teethed claw 10a serves to control fixedness of the sun gear 4.

A stepping clutch mechanism 100 is installed on the wheel shaft 1. The stepping clutch mechanism 100 is driven by a rotating unit 90. The stepping clutch mechanism 100 serving to control opening and closing of the shaft claw 10 to control fixedness of the sun gear 4. The stepping clutch mechanism 100 includes a plurality of first control claws 71 and a plurality of second control claws 72 for controlling clutching operation between the stepping clutch mechanism 100 and the rotating unit 90.

The lever 8 serves to control clutching operation between the first control claws 71 and the rotating unit 90 and control clutching operation between the second control claws 72 and the rotating unit 90 to cause the stepping clutch mechanism 100 to perform a stepwise rotation with a fixed angle by driving of rotating unit 90. The stepwise rotation of the stepping clutch mechanism 100 controls opening and closing of the at least one teethed claw 10a to control fixedness of the sun gear 4. The lever 8 is installed with a sliding block 81 (as shown in FIGS. 10 to 12) for controlling opening and closing of the first control claws 71 and the second control claws 72 so as to control the clutching operation between the stepping clutch mechanism 100 and the rotating unit 90.

The rotating unit 90 is selected from a power input device B1, an inner teeth ring 9, a planet frame 2 and a power output device. In this embodiment, the rotating unit 90 is a planet frame 2 which is capable of rotating. The wheel shaft 1 is installed with a planet mechanism 200. The planet mechanism 200 includes the planet frame 2 and a plurality of planet gears 21. The sun gear 4 is engaged to the planet gears 21. The planet gears 21 are installed on a plurality of planet gear shafts 22 of the planet frame 2. The inner side of the planet frame 2 is formed with inner teeth 20 for engaging to the first control claw 71 and the second control claw 72. A ratchet claw 3 and a ratchet claw returning spring 31 and a plurality of pads 32 are installed between the planet gears 2 and an inner teeth ring 9. The inner teeth ring 9 is installed on the wheel shaft 1. The ratchet claw 3 is driven by the planet frame 2 to drive the inner teeth ring 9.

Figures 22, 23:
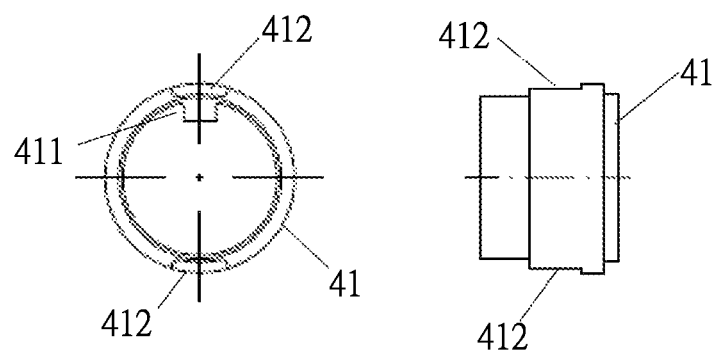
FIG. 22 is a side view of the sun gear ring of the second embodiment of the present invention.
FIG. 23 is a left side view of FIG. 22.
Figure 24:
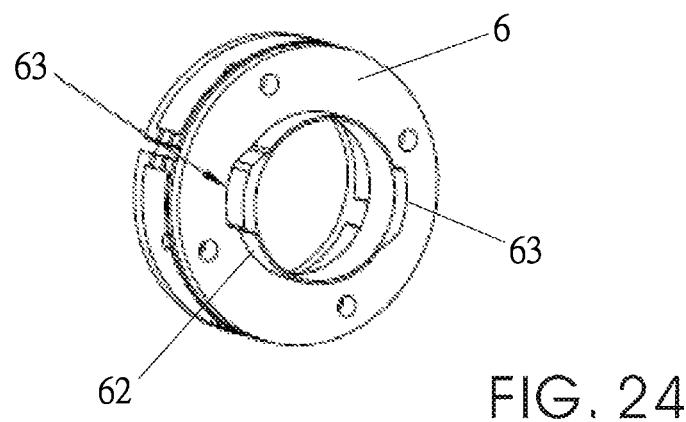
FIG. 24 is a schematic view of the ratchet claw clutching ring of the second embodiment of the present invention.
Figures 25, 26:
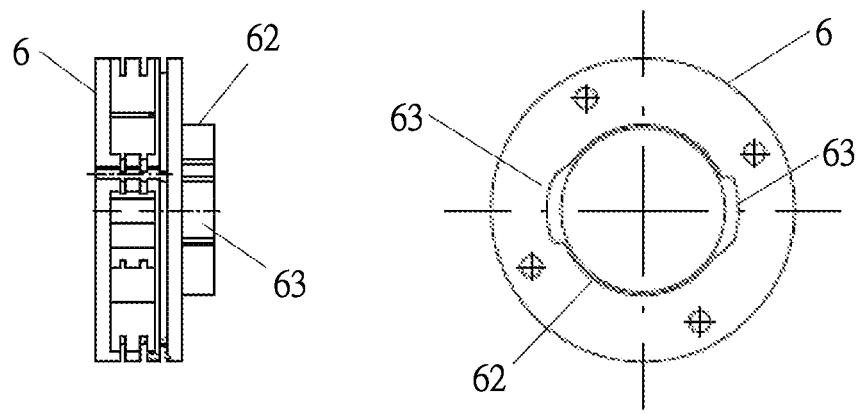
FIG. 25 is a side view of the ratchet claw clutching ring of the second embodiment of the present invention.
FIG. 26 is a left side view of FIG. 25.

The stepping clutch mechanism 100 includes:

A ratchet claw clutching ring 6 is installed with a plurality of claw control shafts 7. The first control claws 71 and the second control claws 72 are installed on the claw control shafts 7, respectively. Referring to FIGS. 23 to 25, an outer ring 62 formed on an outer side of the ratchet claw clutching ring 6 closing to the sun gear 4. An outer annular surface of the outer ring 62 is formed with at least one protruded block 63 for controlling opening and closing of the at least one teethed claw 10a.

A cam base 5 (as shown in FIGS. 7 to 9) is positioned at an inner side of the ratchet claw clutching ring 6 and is formed with a guiding groove 51 and a lifting slope 52 positioned at an outer side of the guiding groove 51. The sliding block 81 is capable of moving axially in the guiding groove 51.

A claw control returning spring 73 encloses the claw control shafts 7.

A positioning pin 74 serves to position the claw control shafts 7.

The wheel shaft 1 passes through the sun gear 4 and the stepping clutch mechanism 100. The first control claws 71 and the second control claws 72 are positioned between an inner side of the planet frame 2 and an outer side of the cam base 5. The first control claws 71 and the second control claws 72 are arranged in an interleaved order. The lifting slope 52 and axial moving of the sliding block 81 serve to control the opening and closing of the first control claws 71 and the second control claws 72 to cause the ratchet claw clutching ring 6 and the at least one protruded block 63 to rotate stepwise by driving of the rotating unit 90. The at least one protruded block 63 rotates to block or leave at least one outer recess 412 of the sun gear ring 41 to control the opening and closing of the at least one teethed claw 10a so as to control fixedness of the sun gear 4.

Figure 21:
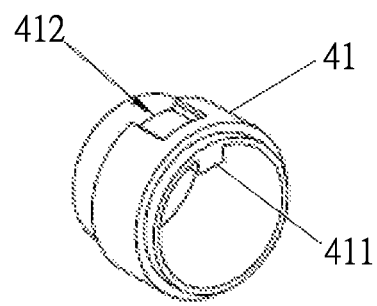
FIG. 21 is a schematic view of the sun gear ring of the second embodiment of the present invention.

Referring to FIGS. 21 to 23, the sun gear ring 41 is installed between the wheel shaft 1 and the sun gear 4. An inner annular surface of the sun gear ring 41 is formed with a protruded portion 411 engaged to the guiding trench 11. An outer annular surface of the sun gear ring 41 is formed with the at least one outer recess 412 for receiving the at least one teethed claw 10a to control fixedness of the sun gear 4.

An inner annular surface of the sun gear 4 is formed with at least one inner groove 40 for positioning the at least one teethed claw 10a. When the at least one teethed claw 10a is not engaged to the at least one outer recess 412, the sun gear 4 is not fixed on the sun gear ring 41.

Figure 19:
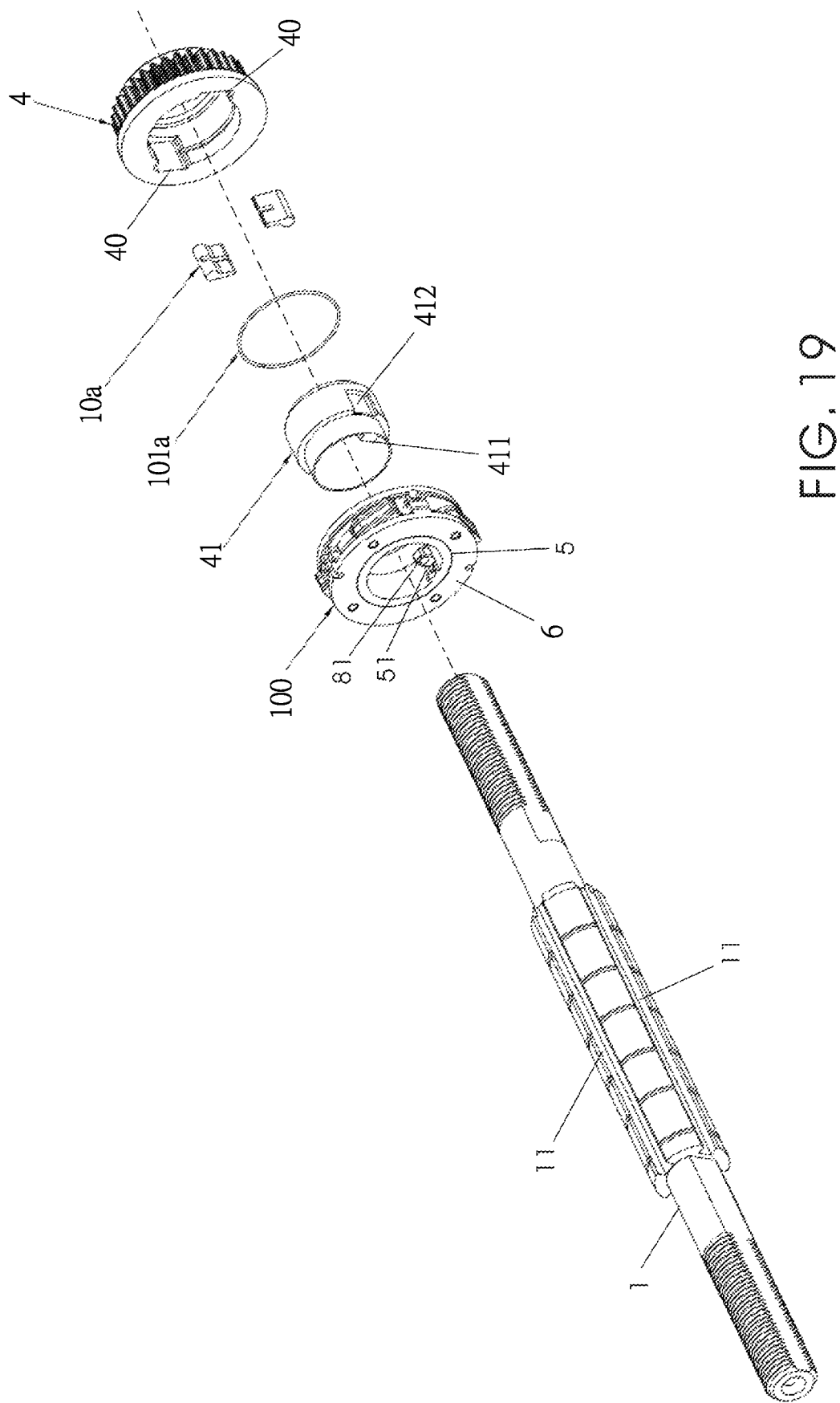
FIG. 19 is an exploded schematic view of the wheel shaft, stepping clutch mechanism, sun gear ring, teethed claw and sun gear of the second embodiment of the present invention.

Referring to FIG. 19, the at least one teethed claw 10a is positioned between the at least one outer recess 412 and the at least one inner groove 40.

The lever 8 serves to control the ratchet claw clutching ring 6 to be driven by the rotating unit 90 and rotated with a fixed angle around the cam base 5 of the stepping clutch mechanism 100.

The cam base 5 is fixed in the inner side of the ratchet claw clutching ring 6. The ratchet claw clutching ring 6 is capable of rotating around the cam base 5. Referring to FIGS. 13 to 17, inner ends of each of the first control claws 71 and each of the second control claws 72 resist against the cam base 5.

Preferably, the at least one protruded block 63 is two protruded blocks 63. The at least one outer recess 412 is two outer recesses 412. The at least one teethed claw 10a is two teethed claws 10a.

Figure 27:
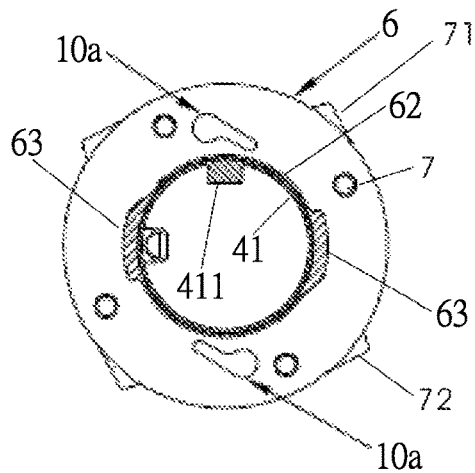
FIG. 27 is a schematic view showing the relations of the ratchet claw clutching ring, sun gear ring and teethed claw of the second embodiment of the present invention, wherein the outer recess is not blocked by the protruded block and is engaged to the teethed claw.
Figure 28:
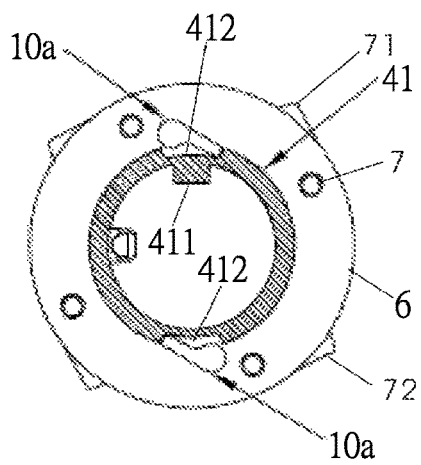
FIG. 28 is another schematic view of FIG. 27, wherein the outer ring is not shown.
Figure 29:
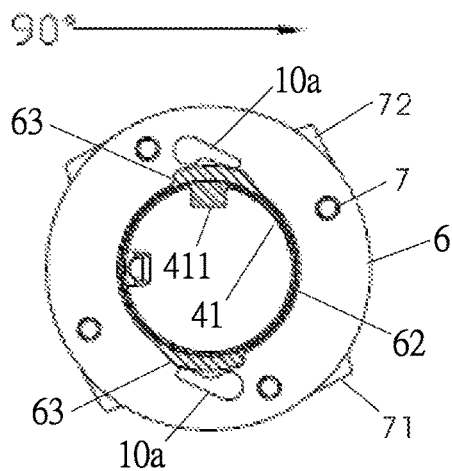
FIG. 29 is a schematic view showing the relations of the ratchet claw clutching ring, sun gear ring and teethed claw of the second embodiment of the present invention, wherein the outer recess is blocked by the protruded block and the teethed claw is not engaged to the outer recess.
Figure 31:
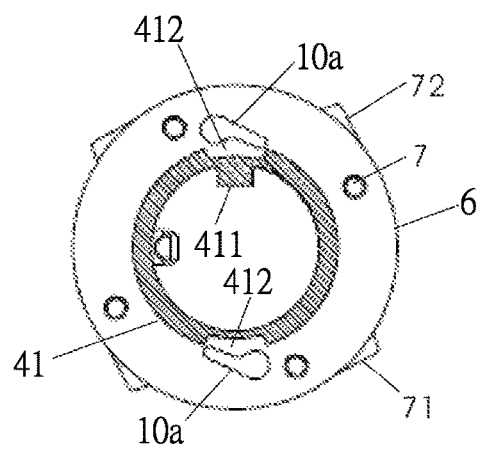
FIG. 31 is another schematic view of FIG. 29, wherein the outer ring is not shown.
Figure 30:
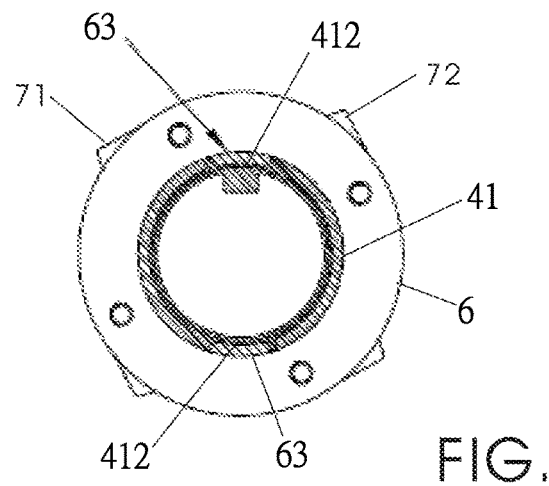
FIG. 30 is another schematic view of FIG. 29, wherein the teethed claw is not shown.

Referring to FIGS. 27 to 31, the sun gear ring 41 is fixed and non-rotatable. FIGS. 27 and 28 show the state where the ratchet claw clutching ring 6 does not rotate. The protruded blocks 63 do not block the outer recesses 412 and the teethed claws 10a are engaged to the outer recesses 412 to cause the teethed claws 10a are closed and the sun gear 4 is fixed on the sun gear ring 41. FIGS. 29 to 31 show the state where the ratchet claw clutching ring 6 rotates through a predetermined angle (such as 90 degrees). The protruded blocks 63 rotate to block the outer recesses 412 and the teethed claws 10a are lifted to leave the outer recesses 412 to cause the teethed claws 10a are closed and the sun gear 4 is freed and not fixed on the sun gear ring 41.

Referring to FIGS. 13 and 17, the stepwise rotation of the ratchet claw clutching ring 6 is controlled by the sliding block 81, the first control claws 71 and the second control claws 72. In an initial state, the inner end of one of the second control claws 72 is resisted to be closed by the sliding block 81; and inner ends the other control claw 72 and the first control claws 71 is closed by resisting against the cam base 5. Referring to FIGS. 14 and 17, when the sliding block 81 moves forward, the inner end of the second control claw 72 originally resisted by the sliding block 81 enters into the guiding groove 51 and an outer end of this second control claw 72 is engaged to the inner teeth 20 of the planet frame 2 to cause this second control claws 72 to be opened. Then the planet frame 2 drives the first control claws 71 and the second control claws 72 and the ratchet claw clutching ring 6 to rotate through a predetermined angle; and the inner end of the second control claw 72 moves to the lifting slope 52. Referring to FIGS. 15 and 17, when the inner end of the second control claw 72 leaves the lifting slope 52, the outer end of the second control claw 72 leaves the inner teeth 20 of the planet frame 2 to cause the second control claw 72 to be closed again. At the same time, the inner end of the first control claw 71 adjacent to the second control claw 72 moves to the sliding block 81 and is resisted by the sliding block 81 to complete a speed change period. Therefore, the at least one teethed claw 10a is opened or closed by above stepwise rotation of the ratchet claw clutching ring 6 and controls the fixedness of the sun gear 4.

Therefore the present invention has the following advantages. It can provide a precise and simple clutching structure of an internal speed change device of a wheel hub. Furthermore, the present invention is advantageous in industry with a higher economic effect. The lever of the present invention controls the fixedness of the sun gear by a non-direct way of operation so that the lever does not receive high resistance directly from the sun gear during speed change operation. As a result, operation of the lever is easier and saves more efforts so as to ensure safety of the operation of the lever and increase service life of the lever.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A control device of an internal speed change device of a wheel hub for indirect clutching operation comprising:
    a sun gear (4) installed on a sun gear ring (41) which is installed on a wheel shaft (1); the wheel shaft (1) being formed with at least one guiding trench (11);
    a shaft claw (10) installed between the sun gear (4) and the wheel shaft (1); the shaft claw (10) serving to control fixedness of the sun gear (4);
    a stepping clutch mechanism (100) installed on the wheel shaft (1); the stepping clutch mechanism (100) being driven by a rotating unit (90); the stepping clutch mechanism (100) serving to control opening and closing of the shaft claw (10) to control fixedness of the sun gear (4); the stepping clutch mechanism (100) including a plurality of first control claws (71) and a plurality of second control claws (72) for controlling clutching operation between the stepping clutch mechanism (100) and the rotating unit (90);
    a lever (8) installed in one of the at least one guiding trench (11); the lever (8) being capable of moving axially in the guiding trench (11); and
    wherein the lever (8) serves to control clutching operation between the first control claws (71) and the rotating unit (90) and control clutching operation between the second control claws (72) and the rotating unit (90) to cause the stepping clutch mechanism (100) to perform a stepwise rotation with a fixed angle by driving of the rotating unit (90); the stepwise rotation of the stepping clutch mechanism (100) controls opening and closing of the shaft claw (10) to control fixedness of the sun gear (4); and the lever (8) is installed with a sliding block (81) for controlling opening and closing of the first control claws (71) and the second control claws (72).

2. The control device of the internal speed change device of the wheel hub for indirect clutching operation as claimed in claim 1, wherein the rotating unit (90) is selected from a power input device (B1), an inner teeth ring (9), a planet frame (2) and a power output device.

3. The control device of the internal speed change device of the wheel hub for indirect clutching operation as claimed in claim 1, wherein the stepping clutch mechanism (100) includes:
    a ratchet claw clutching ring (6) installed with a plurality of claw control shafts (7); the first control claws (71) and the second control claws (72) being installed on the claw control shafts (7), respectively; an inner annular surface of the ratchet claw clutching ring (6) being formed with at least one inner recess (61) for controlling opening and closing of the shaft claw (10);
    a cam base (5) positioned at an inner side of the ratchet claw clutching ring (6) and formed with a guiding groove (51) and a lifting slope (52) positioned at an outer side of the guiding groove (51); the sliding block (81) being capable of moving axially in the guiding groove (51);
    a claw control returning spring (73) enclosing the claw control shafts (7); and
    a positioning pin (74) serving to position the claw control shafts (7); and
    wherein the wheel shaft (1) passes through the sun gear (4) and the stepping clutch mechanism (100); the first control claws (71) and the second control claws (72) are arranged in an interleaved order; the lifting slope (52) and axial moving of the sliding block (81) serve to control the opening and closing of the first control claws (71) and the second control claws (72) to cause the ratchet claw clutching ring (6) to rotate stepwise by driving of the rotating unit (90); and stepwise rotation of the ratchet claw clutching ring (6) controls the opening and closing of the shaft claw (10) to control fixedness of the sun gear (4).

4. The control device of the internal speed change device of the wheel hub for indirect clutching operation as claimed in claim 3, wherein the cam base (5) is fixed in the inner side of the ratchet claw clutching ring (6); the ratchet claw clutching ring (6) is capable of rotating around the cam base (5); and inner ends of each of the first control claws (71) and each of the second control claws (72) resist against the cam base (5).

5. The control device of the internal speed change device of the wheel hub for indirect clutching operation as claimed in claim 3, wherein the lever (8) serves to control the ratchet claw clutching ring (6) to be driven by the rotating unit (90) and rotated with a fixed angle around the cam base (5) of the stepping clutch mechanism (100).

6. A control device of an internal speed change device of a wheel hub for indirect clutching operation comprising:
    a sun gear (4) installed on a sun gear ring (41) which is installed on a wheel shaft (1); the wheel shaft (1) being formed with at least one guiding trench (11);
    at least one teethed claw (10a) installed between the sun gear (4) and the wheel shaft (1); the at least one teethed claw (10a) serving to control fixedness of the sun gear (4);
    a stepping clutch mechanism (100) installed on the wheel shaft (1); the stepping clutch mechanism (100) being driven by a rotating unit (90); the stepping clutch mechanism (100) serving to control opening and closing of the at least one teethed claw (10a) to control fixedness of the sun gear (4); the stepping clutch mechanism (100) including a plurality of first control claws (71) and a plurality of second control claws (72) for controlling clutching operation between the stepping clutch mechanism (100) and the rotating unit (90);
    a lever (8) installed in one of the at least one guiding trench (11); the lever (8) being capable of moving axially in the guiding trench (11); and
    wherein the lever (8) serves to control clutching operation between the first control claws (71) and the rotating unit (90) and control clutching operation between the second control claws (72) and the rotating unit (90) to cause the stepping clutch mechanism (100) to perform a stepwise rotation with a fixed angle by driving of the rotating unit (90); the stepwise rotation of the stepping clutch mechanism (100) controls opening and closing of the at least one teethed claw (10a) to control fixedness of the sun gear (4); and the lever (8) is installed with a sliding block (81) for controlling opening and closing of the first control claws (71) and the second control claws (72).

7. The control device of the internal speed change device of the wheel hub for indirect clutching operation as claimed in claim 6, wherein the rotating unit (90) is selected from a power input device (B1), an inner teeth ring (9), a planet frame (2) and a power output device.

8. The control device of the internal speed change device of the wheel hub for indirect clutching operation as claimed in claim 6, wherein the stepping clutch mechanism (100) includes:
- a ratchet claw clutching ring (6) installed with a plurality of claw control shafts (7); the first control claws (71) and the second control claws (72) being installed on the claw control shafts (7), respectively; an outer ring (62) formed on an outer side of the ratchet claw clutching ring (6) closing to the sun gear (4); an outer annular surface of the outer ring (62) being formed with at least one protruded block (63) for controlling opening and closing of the at least one teethed claw (10a);
- a cam base (5) positioned at an inner side of the ratchet claw clutching ring (6) and formed with a guiding groove (51) and a lifting slope (52) positioned at an outer side of the guiding groove (51); the sliding block (81) being capable of moving axially in the guiding groove (51);
- a claw control returning spring (73) enclosing the claw control shafts (7); and
- a positioning pin (74) serving to position the claw control shafts (7); and
- wherein the wheel shaft (1) passes through the sun gear (4) and the stepping clutch mechanism (100); the lifting slope (52) and axial moving of the sliding block (81) serve to control the opening and closing of the first control claws (71) and the second control claws (72) to cause the ratchet claw clutching ring (6) and the at least one protruded block (63) to rotate stepwise by driving of the rotating unit (90); and the at least one protruded block (63) rotates to block or leave at least one outer recess (412) of the sun gear ring (41) to control the opening and closing of the at least one teethed claw (10a) so as to control fixedness of the sun gear (4).

9. The control device of the internal speed change device of the wheel hub for indirect clutching operation as claimed in claim 8, wherein the sun gear ring (41) is installed between the wheel shaft (1) and the sun gear (4); an inner annular surface of the sun gear ring (41) is formed with a protruded portion (411) engaged to the guiding trench (11); and an outer annular surface of the sun gear ring (41) is formed with the at least one outer recess (412) for receiving the at least one teethed claw (10a) to control fixedness of the sun gear (4).

10. The control device of the internal speed change device of the wheel hub for indirect clutching operation as claimed in claim 8, wherein an inner annular surface of the sun gear (4) is formed with at least one inner groove (40) for positioning the at least one teethed claw (10a); when the at least one teethed claw (10a) is not engaged to the at least one outer recess (412), the sun gear (4) is not fixed on the sun gear ring (41).

11. The control device of the internal speed change device of the wheel hub for indirect clutching operation as claimed in claim 10, wherein the at least one teethed claw (10a) is positioned between the at least one outer recess (412) and the at least one inner groove (40).

12. The control device of the internal speed change device of the wheel hub for indirect clutching operation as claimed in claim 6, wherein the lever (8) serves to control the ratchet claw clutching ring (6) to be driven by the rotating unit (90) and rotated with a fixed angle around the cam base (5) of the stepping clutch mechanism (100).

13. The control device of the internal speed change device of the wheel hub for indirect clutching operation as claimed in claim 6, wherein the cam base (5) is fixed in the inner side of the ratchet claw clutching ring (6); the ratchet claw clutching ring (6) is capable of rotating around the cam base (5); and inner ends of each of the first control claws (71) and each of the second control claws (72) resist against the cam base (5).

* * * * *